2,994,701
2-SULFAMYL-4-SUBSTITUTED-THIAZOLES HAVING DIURETIC PROPERTIES

James M. Sprague, Gwynedd Valley, and Carl Ziegler, Glenside, Pa., assignors to Merck & Co., Inc., Rahway, N.J., a corporation of New Jersey
No Drawing. Filed Apr. 6, 1959, Ser. No. 804,134
2 Claims. (Cl. 260—302)

This invention relates to novel 2-sulfamyl-4-substituted-thiazoles and alkali metal salts thereof, which have the structural formula:

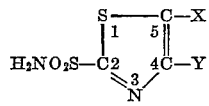

where X is selected from the group consisting of hydrogen, carboxyl and chlorine, and Y is selected from the group consisting of methyl, carboxyl, phenyl, and p-carboxyphenyl.

The new compounds in accordance with this invention are useful chemotherapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving the compounds in the selected medium. The alkali metal salts are stable of themselves, although preservatives may be added if desired.

The dosage of the 2-sulfamyl-4-substituted-thiazoles may be varied over a wide range and for this reason, scored tablets containing 100, 150, 250 and 500 milligrams of the active ingredient may be made available to the physician for the symptomatic adjustment of the dosage to the individual patient. These dosages are well below the toxic or lethal dose of the compound.

2-sulfamyl-4-substituted-thiazoles in accordance with this invention are readily prepared by forming the desired 2-mercapto thiazole (substituted at the 4 position) by the reaction of the appropriate α-haloketone with ammonium dithiocarbamate, then converting the mercapto group to sulfonyl chloride by low temperature chlorination, after which treatment with ammonia converts the sulfonyl chloride group to a sulfamyl group.

Where suitable mercapto thiazoles are available as starting materials, they can simply be processed as indicated above, converting the mercapto group into the sulfonyl chloride group, and then to the sulfamyl group.

The alkali metal salts of the compounds of this invention are prepared with convenience by dissolving the compounds in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other method conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described.

EXAMPLE 1

2-sulfamyl-4-carboxythiazole

STEP 1.—PREPARATION OF 2-MERCAPTO-4-CARBOXYTHIAZOLE

A solution of 35.2 gms. of pyruvic acid in 35 mls. of water was treated at 50° C. with 64 gms. of bromine, added dropwise with stirring. After cooling the reaction mixture, 44 gms. of ammonium dithiocarbamate was added. After stirring for three hours, the product was filtered. After purification there was obtained 17.7 gms. M.P. 256° C.

An analysis of the product showed that it corresponded closely to the empirical formula $C_4H_3NO_2S_2$, confirming that the compound was 2-mercapto-4-carboxythiazole.

STEP 2.—PREPARATION OF 2-MERCAPTO-4-CARBETHOXYTHIAZOLE

Twenty-eight grams of the above acid in 150 mls. of absolute alcohol and 10 mls. of concentrated sulfuric acid were heated under reflux for three hours. After removal of excess alcohol, the residue was poured into ice water (300 mls.) and then filtered. After recrystallization from alcohol, there was obtained 20 gms. M.P. 125–127° C.

An analysis of the product showed that it corresponded closely to the empirical formula $C_6H_7NO_2S_2$, confirming that the compound was 2-mercapto-4-carbethoxythiazole.

STEP 3.—PREPARATION OF 2-CHLOROSULFONYL-4-CARBETHOXYTHIAZOLE

A suspension of 40.0 gms. of 2-mercapto-4-carbethoxythiazole in 500 mls. of 70% aqueous acetic acid was cooled to −10° C. and then saturated with chlorine gas over a period of three hours. The suspension was poured into 3 liters of ice and water and filtered. The residue was taken up in 400 mls. of benzene and dried over $CaCl_2$. Removal of solvent yielded 37.0 gms. of the product M.P. 72–75° C.

An analysis of the product showed that it corresponded closely to the empirical formula $C_6H_6ClNO_4S_2$, confirming that the compound was 2-chlorosulfonyl-4-carbethoxythiazole.

STEP 4.—PREPARATION OF 2-SULFAMYL-4-CARBETHOXYTHIAZOLE

The above sulfonyl chloride (12.3 gms.) was added to 17 gms. of 10% alcoholic ammonia. An immediate precipitate formed. After one-half hour, the suspension was filtered and the residue washed with a little alcohol. On concentration of the alcohol, therewas obtained 8.8 gms. of the product M.P. 150–153° C. Recrystallization from alcohol raised the M.P. to 151–153° C.

An analysis of the product showed that it corresponded closely to the empirical formula $C_6H_8N_2O_4S_2$, confirming that the compound was 2-sulfamyl-4-carbethoxythiazole.

STEP 5.—PREPARATION OF 2-SULFAMYL-4-CARBOXYTHIAZOLE

A sample of 6.8 gms. of the ester was dissolved in 15 mls. of 10% sodium hydroxide and 5 mls. of water. After standing at room temperature for one-half hour the solution was made acid to Congo red. After chilling the solution for two hours, 5.4 gms. of the product M.P. 202–204° C. was obtained. This is the hemihydrate of the desired product.

An analysis of the product showed that it corresponded closely to the empirical formula $C_4H_5N_2O_{4.5}S_2$, confirming that the compound was 2-sulfamyl-4-carboxythiazole hemihydrate.

EXAMPLE 2

*2-sulfamyl-4-methyl-5-carboxythiazole*

2 mercapto-4-methyl-5-carbethoxythiazole (40 gms.) suspended in 400 mls. of 70% aqueous acetic acid was cooled to $-10°$ C. Chlorine gas then was passed into the solution until saturated. The solution then was poured into 8 liters of ice water. A low-melting solid was removed by filtration. The yield was 25.5 gms. of the product M.P. 40–46° C.

The crude sulfonyl chloride obtained above was treated with 34 gms. of 10% alcoholic ammonia at $-10°$ to $-20°$ C. Removal of the solvent and recrystallization from benzene gave 7.3 gms. of 2-sulfamyl-4-methyl-5-carbethoxythiazole M.P. 129–131° C.

An analysis of the product showed that it corresponded closely to the empirical formula $C_7H_{10}N_2O_4S_2$, confirming that the compound was 2-sulfamyl-4-methyl-5-carbethoxythiazole.

When 4.2 gms. of the ester was dissolved in 15 mls. of 10% NaOH for an hour, hydrolysis to the acid took place. Acidification gave 3.4 gms. of the product M.P. 193–194° C.

An analysis of the product showed that it corresponded closely to the empirical formula $C_5H_6N_2O_4S_2$, confirming that the compound was 2-sulfamyl-4-methyl-5-carboxythiazole.

EXAMPLE 3

*2-sulfamyl-4-(p-carbethoxyphenyl)-thiazole*

STEP 1.—PREPARATION OF p-CARBETHOXYPHENACYL CHLORIDE

A suspension of 12.4 gms. of p-cyanophenacyl chloride in 100 mls. of absolute ethanol was saturated with dry hydrogen chloride at 0° C. After standing several days in the refrigerator the solvent was removed and the residue taken up in 200 mls. of water plus 10 mls. of concentrated hydrochloric acid. The product crystallized from solution. The yield was 14.1 gms. of material melting at 79–82° C. Recrystallization from 50% aqueous alcohol raised the melting point to 84–86° C.

An analysis of the product showed that it corresponded closely to the empirical formula $C_{11}H_{11}ClO_3$, confirming that the compound was p-carbethoxyphenacyl chloride.

STEP 2.—PREPARATION OF 2-MERCAPTO-4-(p-CARBETHOXYPHENYL)-THIAZOLE

The reaction of the above chloroketone (7.9 gms.) with ammonium dithiocarbamate (3.85 gms.) essentially as outlined in Example 1, step 1, gave the desired mercapto thiazole (6.5 gms.) M.P. 204–206° C.

An analysis of the product showed that it corresponded closely to the empirical formula $C_{12}H_{11}NO_2S_2$, confirming that the compound was 2-mercapto-4-(p-carbethoxyphenyl)-thiazole.

STEP 3.—PREPARATION OF 2-SULFAMYL-4-(p-CARBETHOXYPHENYL)-THIAZOLE

A suspension of 14.5 gms. of 2-mercapto-4-(p-carbethoxyphenyl)-thiazole in 750 mls. of 70% aqueous acetic acid was cooled to 0° C. and 13 gms. of chlorine was passed in with good stirring in about 15 minutes. The suspension was poured into 2 liters of ice water and filtered. The crude, somewhat unstable, sulfonyl chloride was reacted with ammonia in alcohol to give the desired product. The yield was 9.8 gms. of the product M.P. 248–250° C. Repeated recrystallization from alcohol gives a product melting 253–254° C.

An analysis of the product showed that it corresponded closely to the empirical formula $C_{12}H_{12}N_2O_4S_2$, confirming that the compound was 2-sulfamyl-4-(p-carbethoxyphenyl)-thiazole.

EXAMPLE 4

*2-sulfamyl-4-(p-carboxyphenyl)-thiazole*

A solution of 7.1 gms. of 2-sulfamyl-4-(p-carbethoxyphenyl)-thiazole, obtained as described in Example 3, in 25 mls. of 5% sodium hydroxide was warmed on the steam bath for one-half hour. After cooling to room temperature, acidification with dilute (6 N) hydrochloric acid precipitated 5.9 gms. of the product, M.P. 268° C. Recrystallization from alcohol raised the melting point to 272° C.

An analysis of the product showed that it corresponded closely to the empirical formula $C_{10}H_8N_2O_4S_2$, confirming that the compound was 2-sulfamyl-4-(p-carboxyphenyl)-thiazole.

EXAMPLE 5

*2-sulfamyl-4-(p-carboxyphenyl)-5-chlorothiazole*

When chlorine in excess of four equivalents is passed into a suspension of 2-mercapto-4-(p-carbethoxyphenyl)-thiazole in 70% aqueous acetic acid at $-10°$ C., there is obtained a sulfonyl chloride that on treatment with alcoholic ammonia gives 2-sulfamyl-4-(p-carbethoxyphenyl)-5-chlorothiazole M.P. 203–205° C.

An analysis of the product showed that it corresponded to the empirical formula $C_{12}H_{11}ClN_2O_4S_2$, confirming that the compound was 2-sulfamyl-4-(p-carbethoxyphenyl)-5-chlorothiazole.

When this ester is warmed on the steam bath in 10 volumes of 5% sodium hydroxide for one-half hour, it is hydrolyzed to 2-sulfamyl-4-(p-carboxyphenyl)-5-chlorothiazole M.P. 246° C.

An analysis of the product showed that it corresponded to the empirical formula $C_{10}H_7ClN_2O_4S_2$, confirming that the compound was 2-sulfamyl-4-(p-carboxyphenyl)-5-chlorothiazole.

EXAMPLE 6

*2-sulfamyl-4-phenylthiazole*

A suspension of 19.3 gms. of 2-mercapto-4-phenyl-thiazole was cooled to $-10°$ C. and saturated with chlorine. The reaction then was poured into a liter of ice water and filtered. The residue was added to 100 mls. of liquid ammonia. After the ammonia had evaporated, the residue was taken up in dilute sodium hydroxide, filtered and the product reprecipitated with acid. The yield of product, M.P. 145–147° C., was 2.4 gms. Recrystallization from 30% aqueous alcohol or benzene raised the melting point to 148–150° C.

An analysis of the product showed that it corresponded closely to the empirical formula $C_9H_8N_2O_2S_2$, confirming that the compound was 2-sulfamyl-4-phenylthiazole.

EXAMPLE 7

The product of Example 5 is reacted with an equimolecular amount of NaOH, producing the sodium salt of 2-sulfamyl-4-(p-carboxyphenyl)-5-chlorothiazole.

Activity tests in dogs of 2-sulfamyl-4-(p-carboxyphenyl)-5-chlorothiazole revealed the compound to be active at $\frac{1}{10}$ of the full dose, intravenously, the full dose being conventionally and arbitrarily set at an initial priming dose of 25 mg./kg. of body weight followed by an infusion of 30 milligrams per kilogram of body weight. The compound is also active when administered orally, only ¼ of the full dose being required, the full oral dose being 30 mg./kg.

Toxicity tests on mice showed the active dose to be far below the lethal dose. The $LD_{50}$ is greater than 500 mg. per kg. of body weight, and represents the least dosage that should kill one-half of the animals receiving the dose.

The alkali metal salts of the compounds produced in Examples 1–6 and the free bases, themselves, are similarly effective as diuretic agents.

EXAMPLE 8

The following table shows that part of a full dose at which the compounds were found to be active in accordance with this invention. The standard dosage for the intravenous tests consisted of an initial priming dose of 25 milligrams per kilogram of body weight, followed by an infusion dose of 30 milligrams per kilogram per hour of body weight.

| Example | X | Y | I. V. dose |
|---|---|---|---|
| 1 | H | $CO_2H$ | ¼ |
| 2 | $CO_2H$ | $CH_3$ | ¼ |
| 4 | H | ⬡—$CO_2H$ | ¼ |
| 5 | Cl | ⬡—$CO_2H$ | ¹⁄₁₀ |
| 6 | H | $C_6H_5$ | ¼ |

The above tests were run in dogs.

EXAMPLE 9

Compressed tablet containing 250 milligrams of active ingredient per tablet, in a quantity suitable for fifty tablets:

| | Grams |
|---|---|
| 2-sulfamyl-4-carboxythiazole | 12.500 |
| Calcium phosphate tribasic | 2.095 |
| Methylcellulose 15 c.p.s. 2%, 3 cc | 0.060 |
| Starch paste 10%, 1 part; gelatine solution 20%, 1 part, 3 cc | 0.450 |
| | 15.105 |
| Methylcellulose 15 c.p.s | 0.750 |
| Talc, dried | 0.750 |
| | 16.605 |

2-sulfamyl-4-carboxythiazole and calcium phosphate tribasic are mixed together and then passed twice through No. 60 bolting cloth. The methylcellulose solution is then added and thoroughly mixed in the granulation and the mixture then passed through a No. 10 screen. The starch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a 13⁄32″ standard curvature punch yielding 50 tablets having a thickness of 0.155 to 0.160 inch, ten of which weigh 3.321 grams. The tablets have a hardness of 5 to 6 kilograms measured by the Monsanto Chemical Company tablet hardness tester apparatus, and a disintegration time of 12 minutes when tested by the U.S.P. tablet disintegrating apparatus (U.S. Pharmacopoeia 15th edition p. 937).

The other compounds specifically disclosed herein may also be prepared in tablet form using the procedure described above.

EXAMPLE 10

The following is a suitable mixture, showing appropriate quantities per tablet:

| | Mgm. |
|---|---|
| 2-sulfamyl-4-methyl-5-carboxythiazole | 250 |
| Calcium phosphate tribasic | 40 |
| Starch (as 12.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 9.

Other compounds useful in accordance with this invention are:

2-sulfamyl-4-carboxyl-5-chlorothiazole
2-sulfamyl-4-carboxy-5-carboxythiazole
2-sulfamyl-4-methyl-5-chlorothiazole
2-sulfamyl-4-(p-carboxyphenyl)-5-carboxythiazole
2-sulfamyl-4-phenyl-5-chlorothiazole
2-sulfamyl-4-phenyl-5-carboxythiazole While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

Having thus described our invention, we claim:
1. 2-sulfamyl-4-(p-carboxyphenyl)-thiazole.
2. 2-sulfamyl-4-(p-carboxyphenyl)-5-chlorothiazole.

References Cited in the file of this patent

UNITED STATES PATENTS

| 2,744,907 | Young | May 8, 1956 |
| 2,868,800 | Korman | Jan. 13, 1959 |

OTHER REFERENCES

Miller et al.: J. Am. Chem. Soc., vol. 72, pp. 4893–6 (1950).

Elderfield: Heterocyclic Compounds, vol. 5, pp. 558–9 (1957).